Feb. 4, 1930. V. ROYLE 1,745,644
PANNING MACHINE
Filed Aug. 23, 1922 16 Sheets-Sheet 6

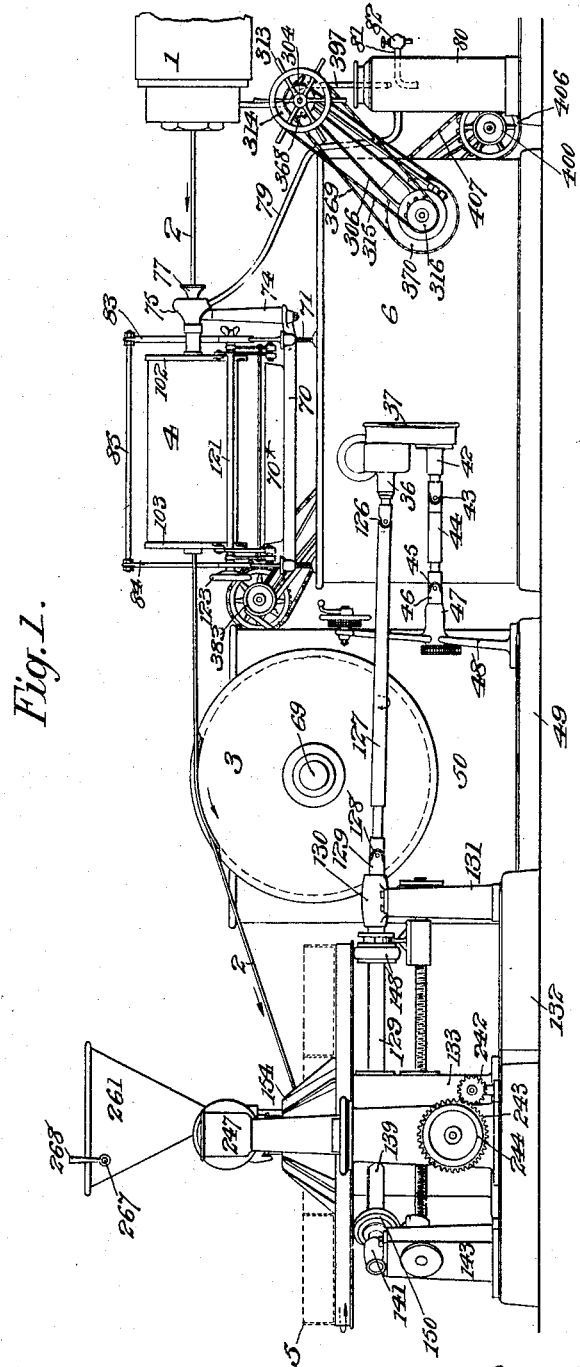

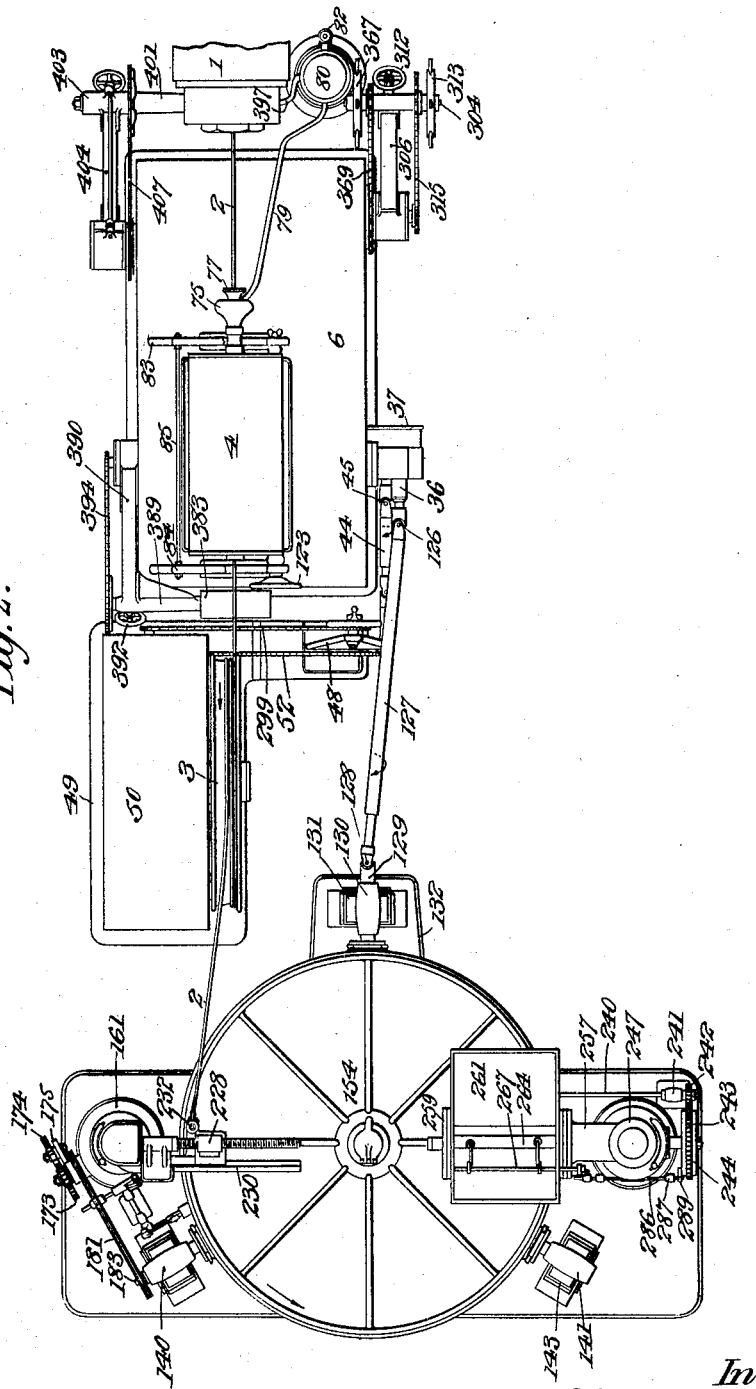

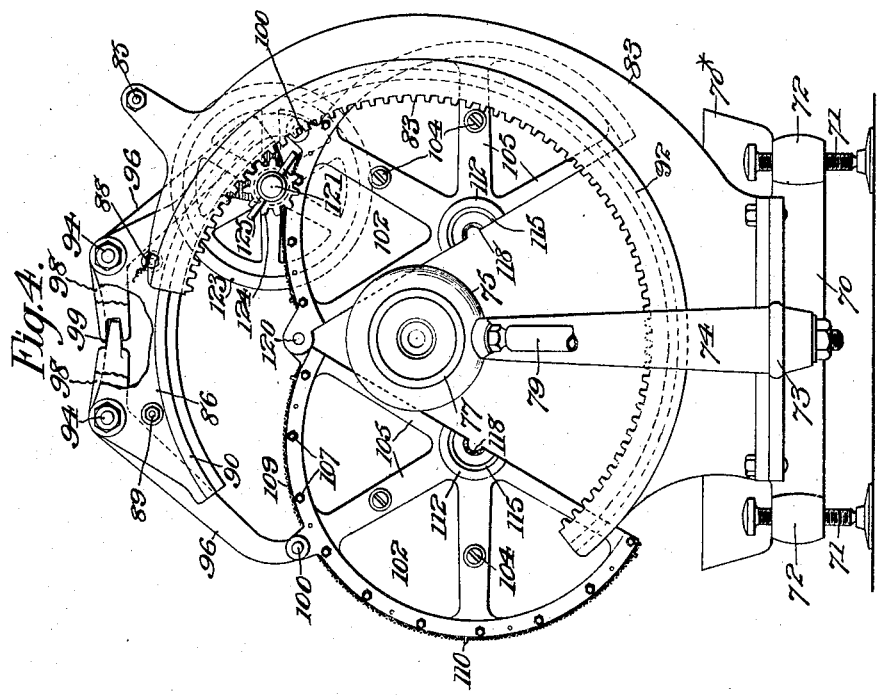
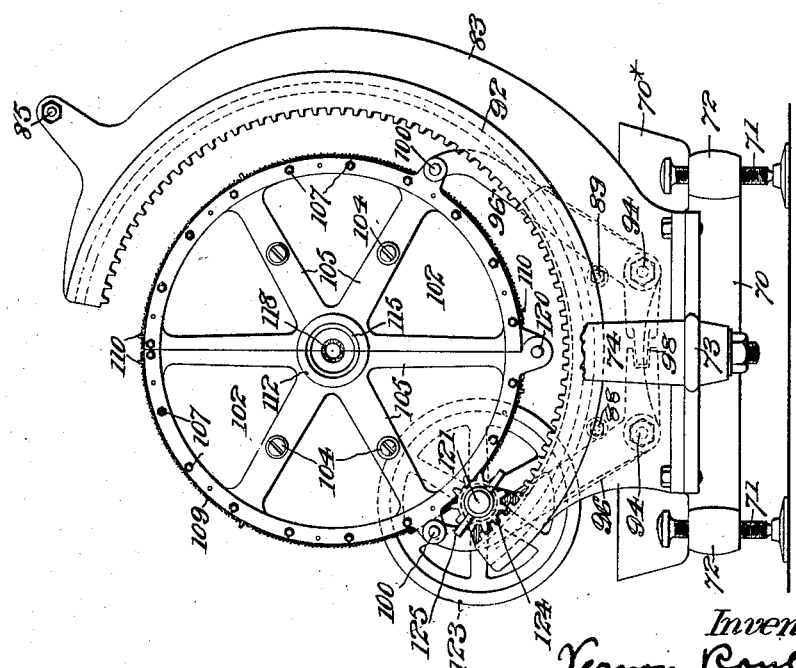

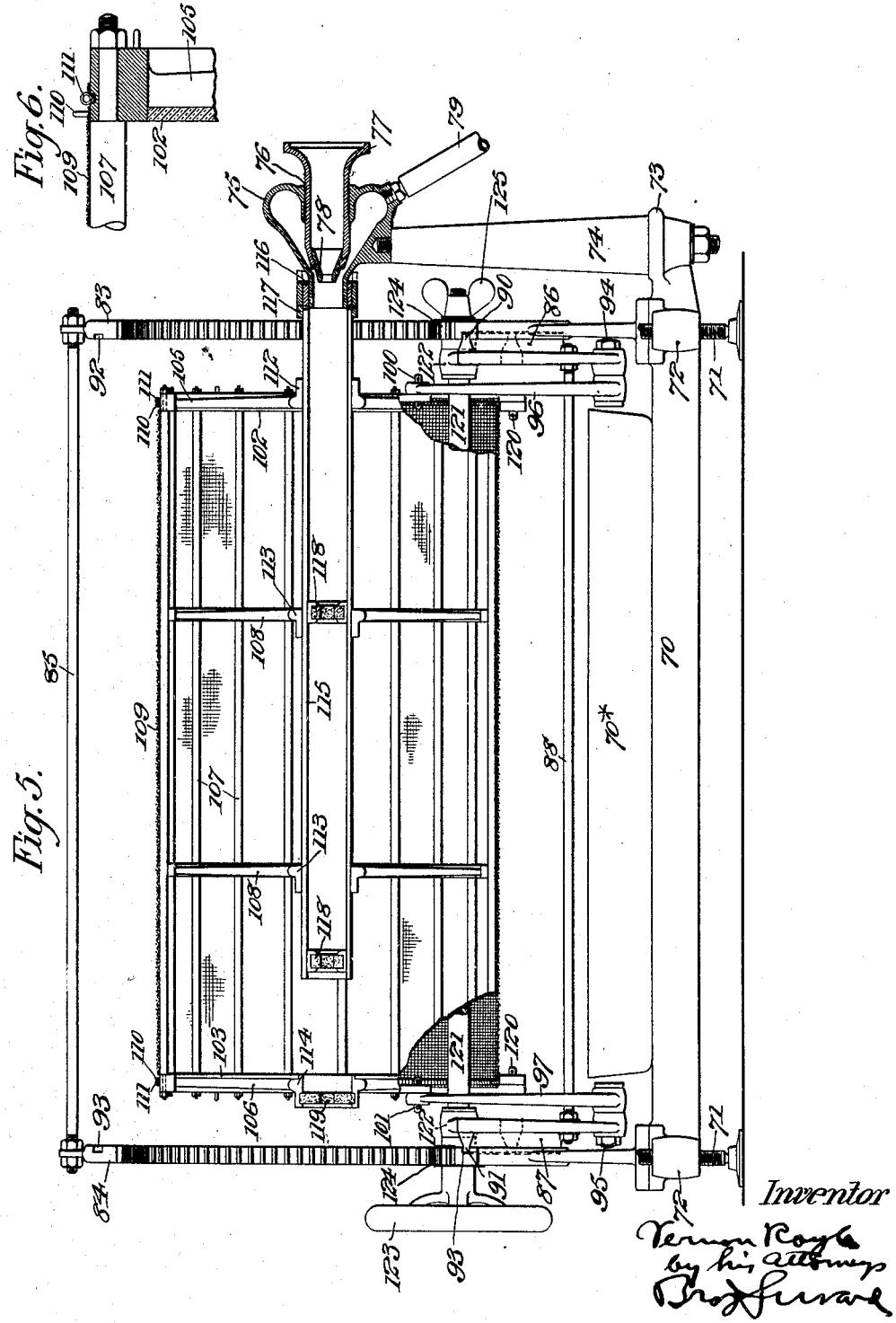

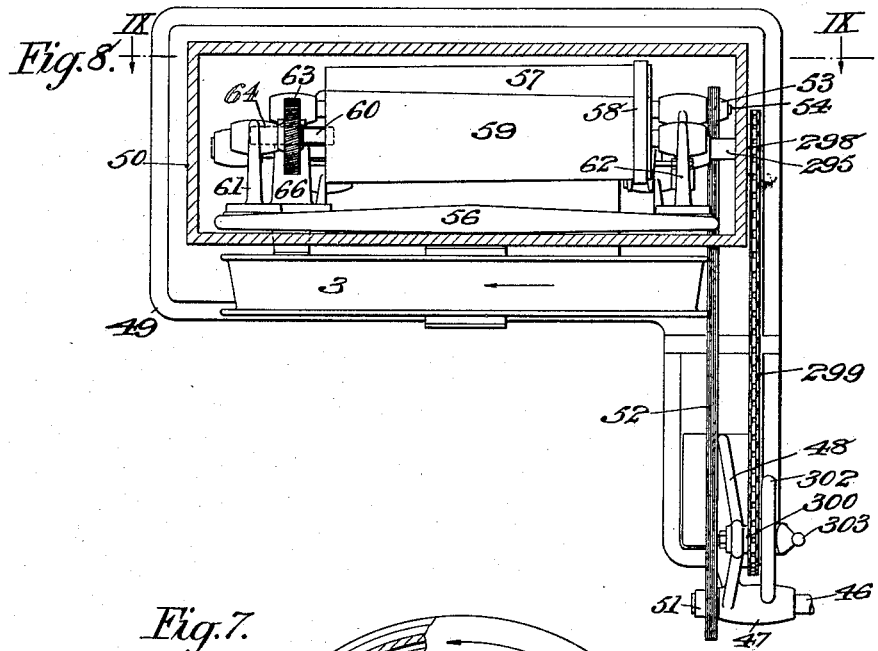
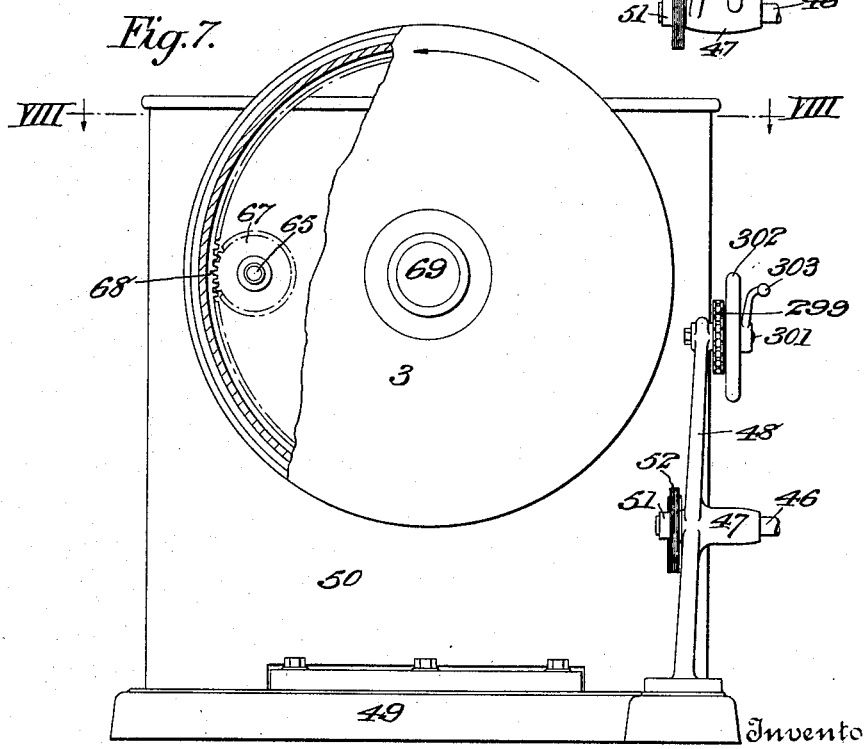

Inventor
Vernon Royle
by his attorneys

Feb. 4, 1930.    V. ROYLE    1,745,644
PANNING MACHINE
Filed Aug. 23, 1922    16 Sheets-Sheet 8
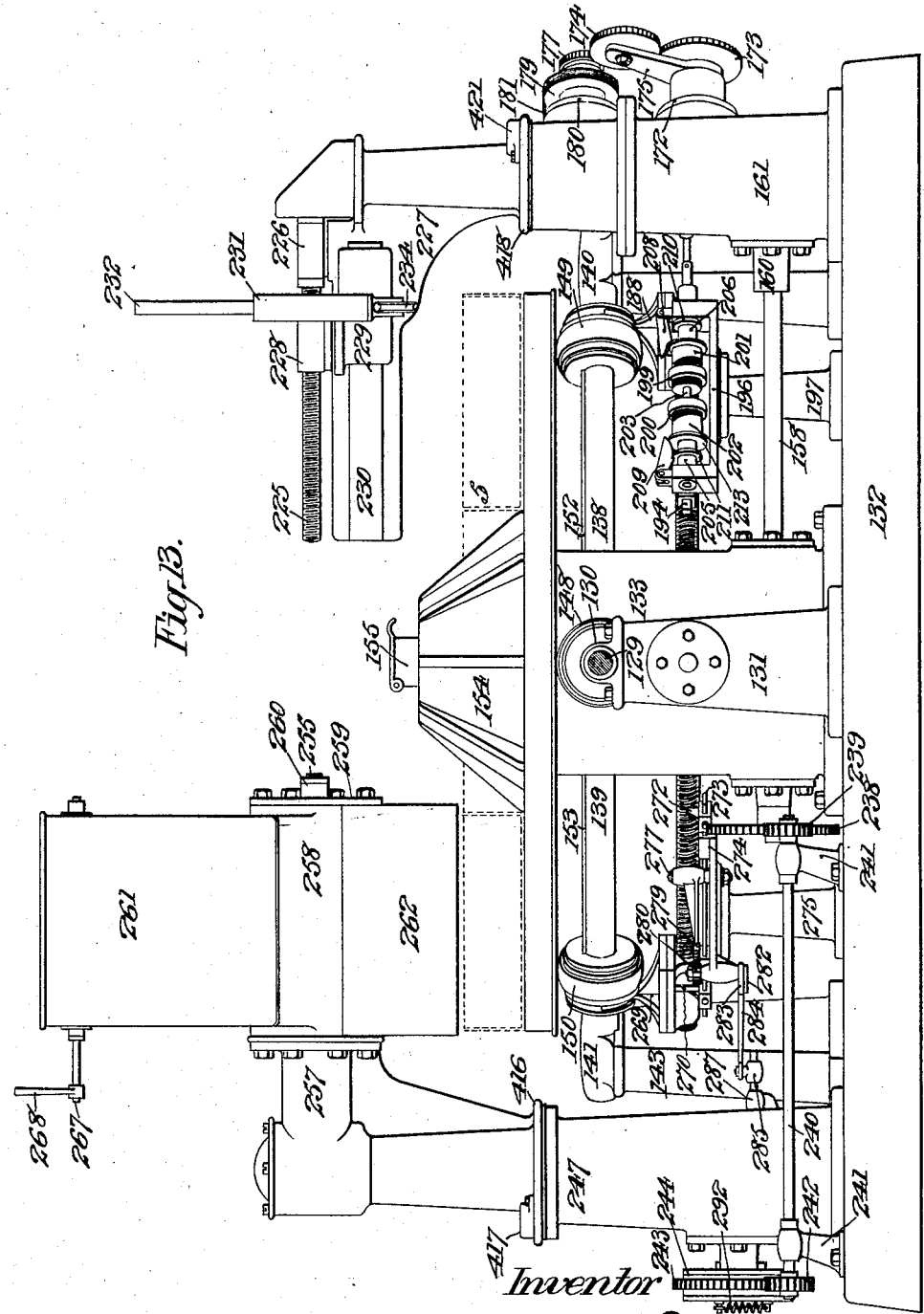
Fig.13.
Inventor

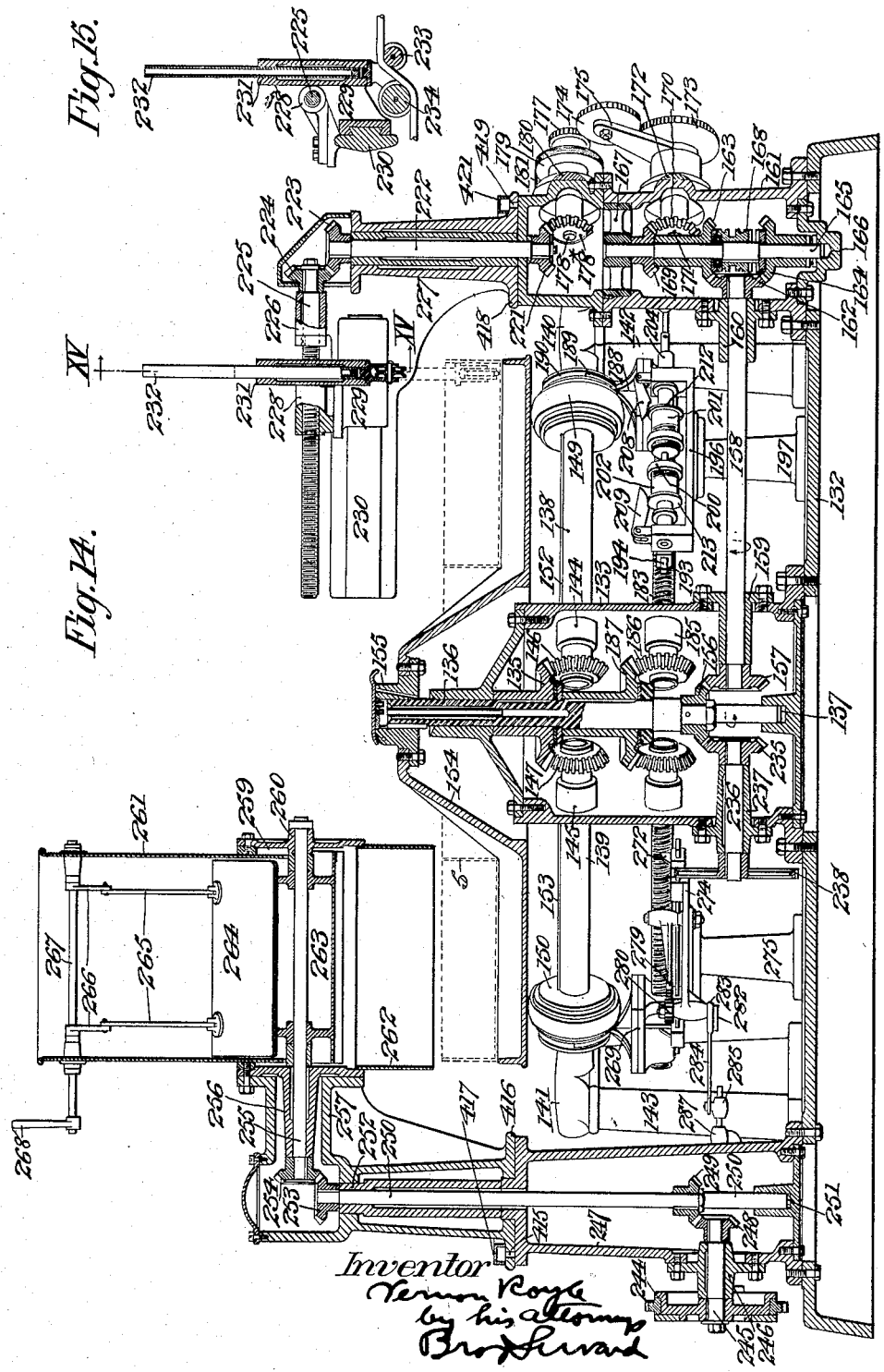

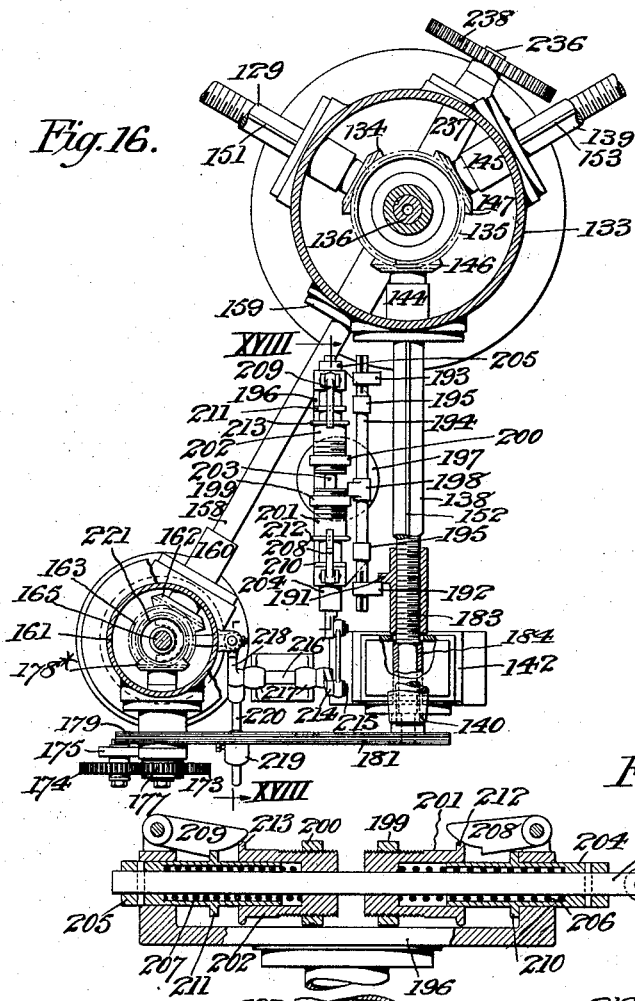

Feb. 4, 1930. V. ROYLE 1,745,644
PANNING MACHINE
Filed Aug. 23, 1922 16 Sheets-Sheet 11
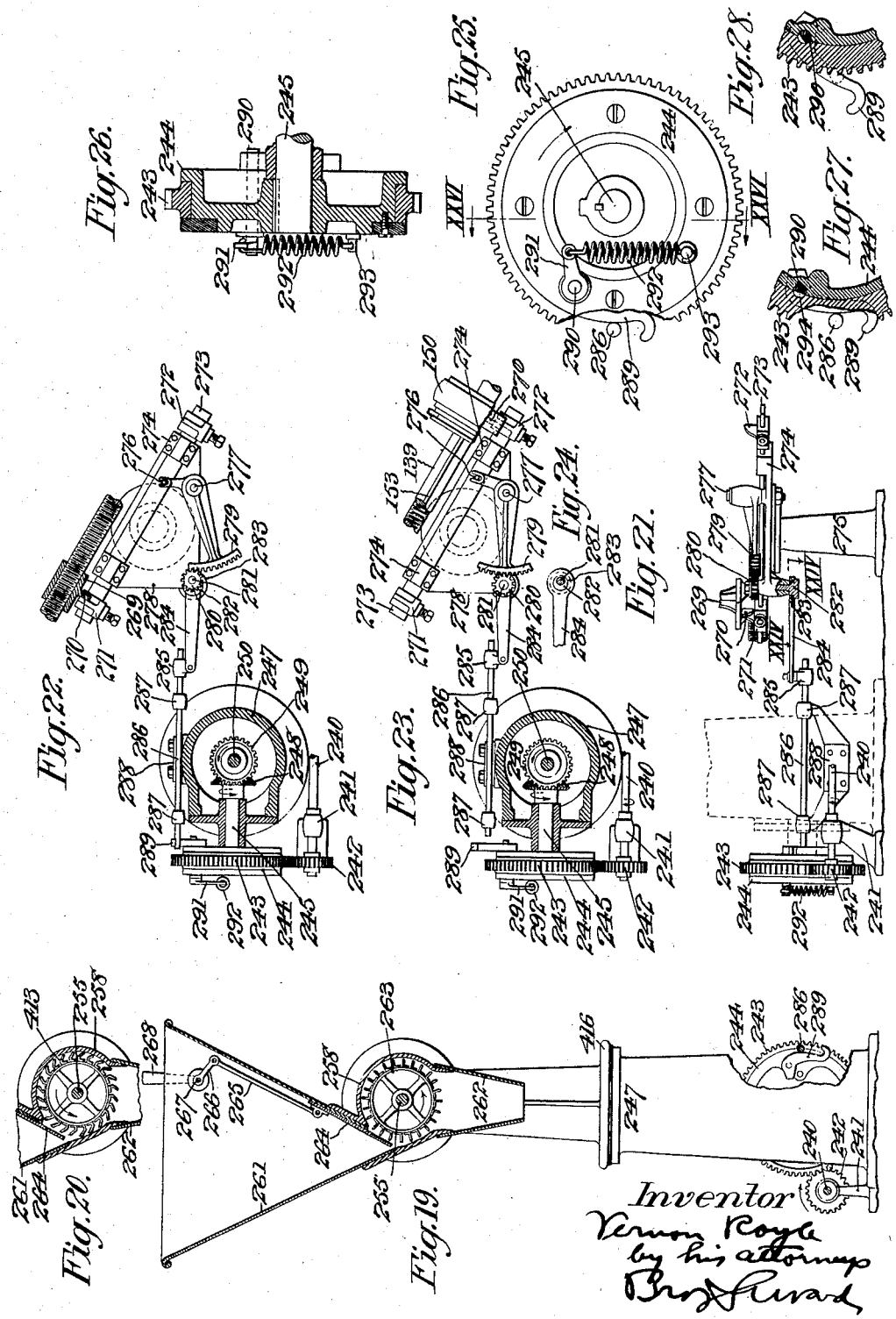

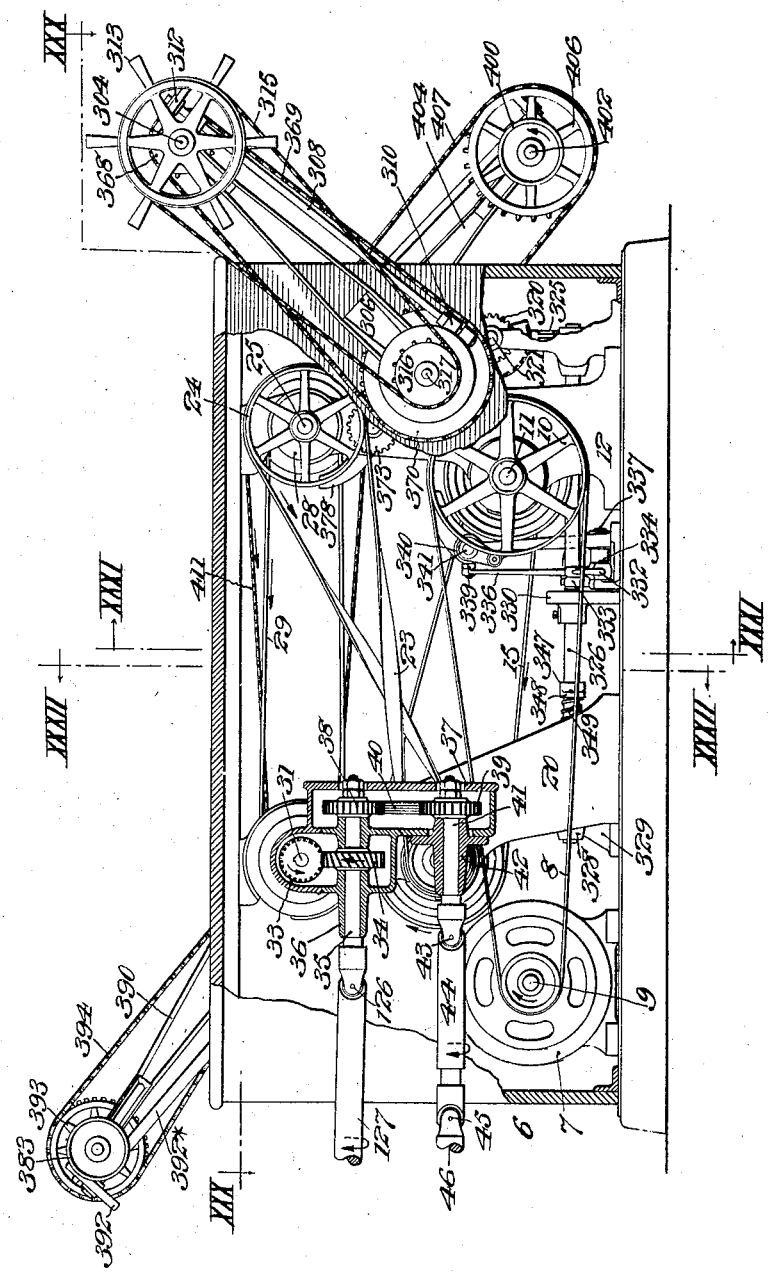

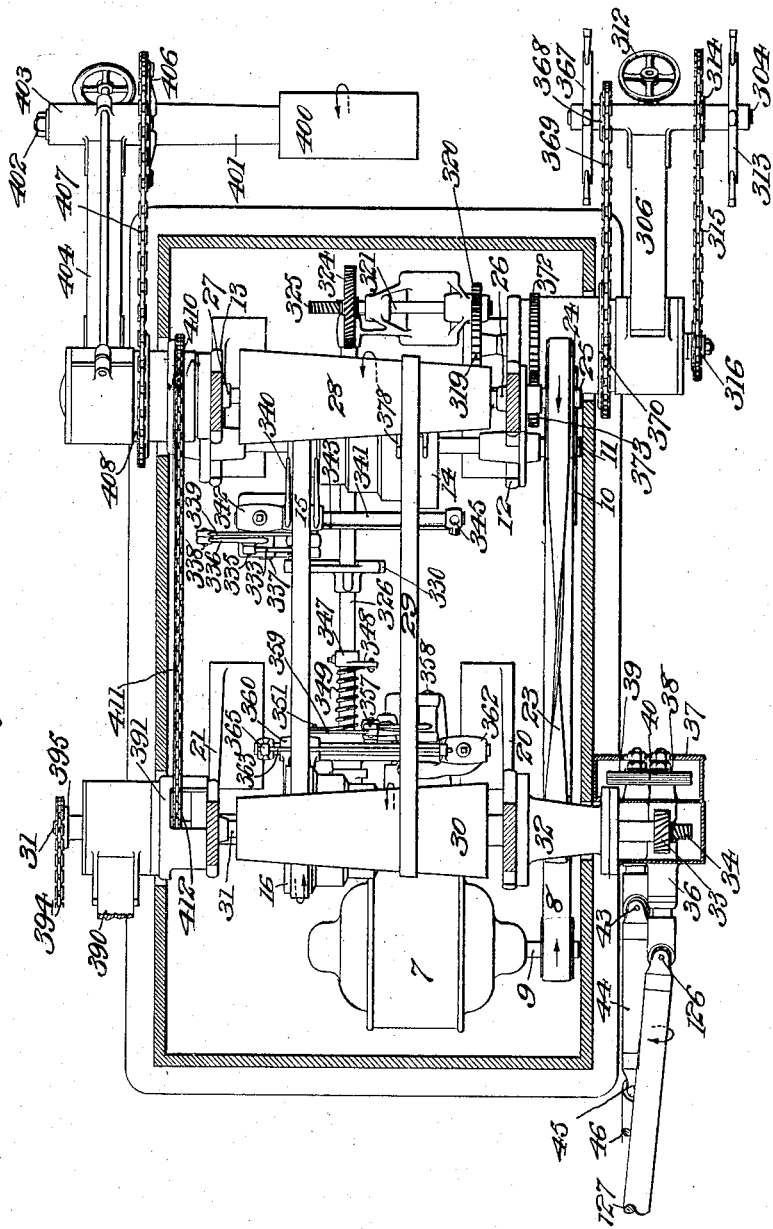

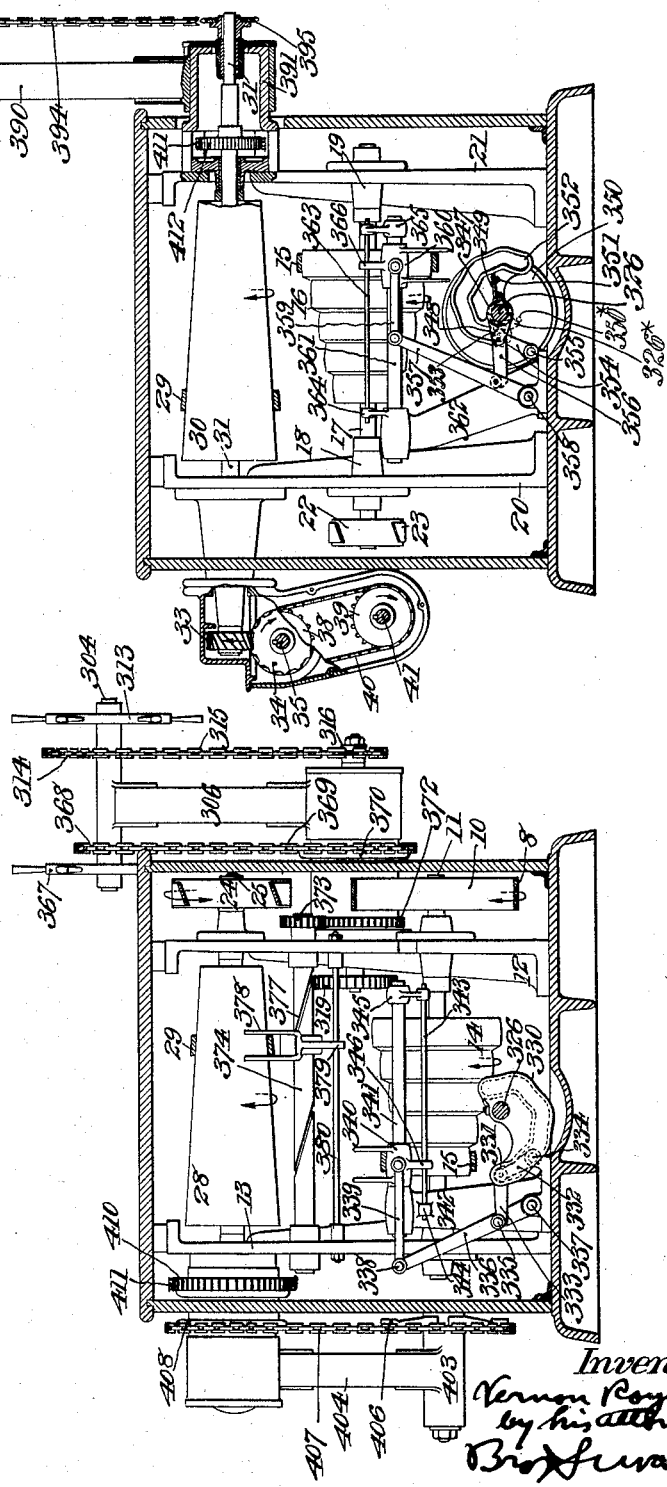

Feb. 4, 1930.　　　　V. ROYLE　　　　1,745,644
PANNING MACHINE
Filed Aug. 23, 1922　　　16 Sheets-Sheet 15

Inventor
Vernon Royle
by his attorney

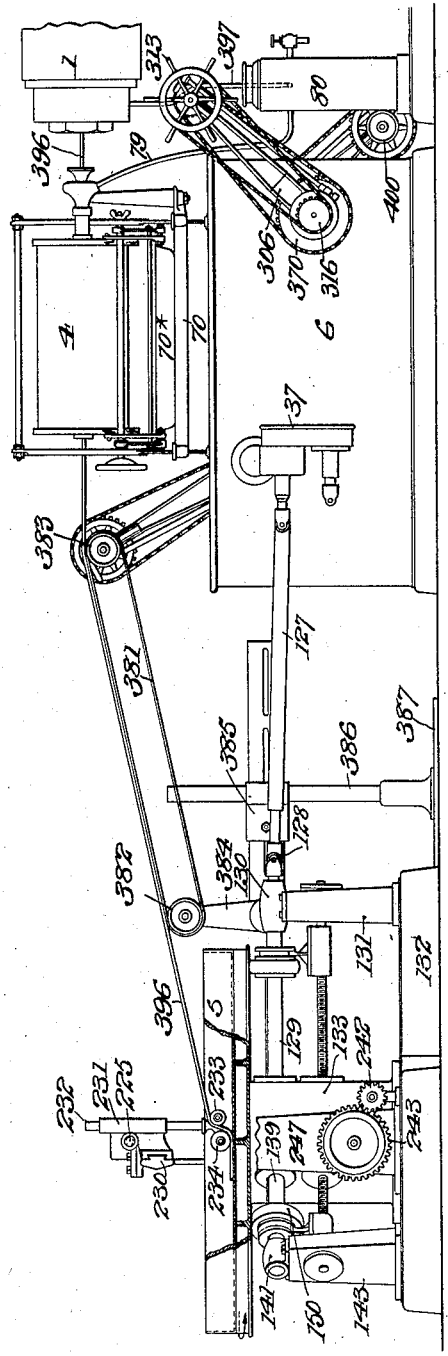
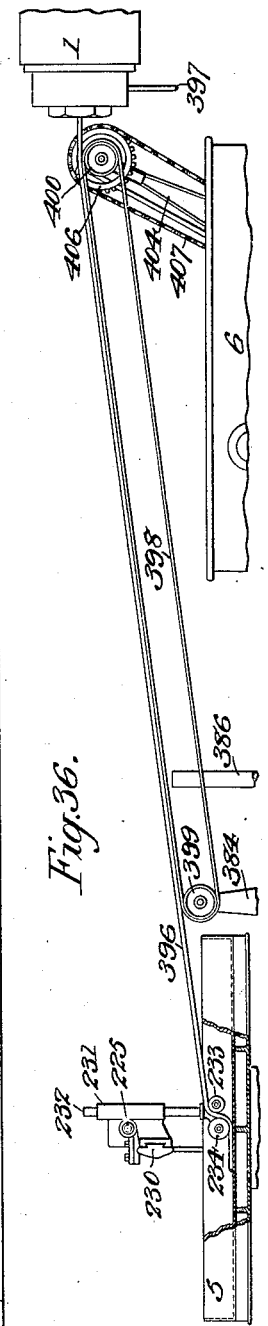

Patented Feb. 4, 1930

1,745,644

UNITED STATES PATENT OFFICE

VERNON ROYLE, OF PATERSON, NEW JERSEY

PANNING MACHINE

Application filed August 23, 1922. Serial No. 583,788.

This invention relates to a panning machine, which is an apparatus that is designed to receive insulated wire or rubber tubing from a tubing or insulating machine and coil the product in a metallic pan, in order that the latter may be placed in a vulcanizer for the purpose of curing the insulation on the wire or the rubber tubing, as the case may be.

An object of the invention consists in providing means for taking the material from the tubing machine under an even tension and coiling the same in the pan with rapidity, accuracy and uniformity.

Another object consists in providing means for subjecting material to a coating of talc, soap stone or the like while it is on its way to the pan, and after each layer has been coiled in the pan.

Another object consists in providing means for regulating the speed of operation of the apparatus and the relative speed of the different moving parts thereof in order to insure not only the greatest rapidity of action consistent with the output of the tubing machine, but to maintain at all times an exactly even tension upon the coiling of the material.

Another object consists in providing such an apparatus in which the operating mechanism is contained therein, thereby avoiding the necessity of overhead shafts, belting and other driving equipment.

Another object consists in providing means for rotating the pan in order to coil the material therein and for varying the speed of rotation of the pan to coincide with the size of the particular coil being laid at any instant.

A further object consists in providing certain improvements in the form, construction and arrangement of the several parts whereby the above named and other objects may be effectively attained.

A practical embodiment of my invention is represented in the accompanying drawings, in which Fig. 1 represents a side elevation of the machine.

Fig. 2 represents a plan view of the same.

Fig. 3 represents an end elevation of the first talc or soapstone applying means, on an enlarged scale, certain of the parts being removed.

Fig. 4 represents a similar view with the parts shown in another position.

Fig. 5 represents a side elevation of the same, partly in section.

Fig. 6 represents a detail, on a still larger scale, of the means of securing the gauze or muslin cover to the talc applying means.

Fig. 7 represents a side elevation of the takeoff device, a portion of which is broken away to show the driving means.

Fig. 8 represents a horizontal section taken in the plane of the line VIII—VIII of Fig 7.

Fig. 13 represents an end view of the same, showing the driving shaft in section.

Fig. 14 represents a vertical section taken in the plane of the line XIV—XIV of Fig. 12, looking in the direction of the arrows.

Fig. 15 represents a detail vertical section taken in the plane of the line XV—XV of Fig. 14, looking in the direction of the arrows.

Fig. 16 represents a detail horizontal section of the means for controlling the drive mechanism of the pan support, certain of the parts being broken away to show other parts below.

Fig. 17 represents a side elevation of the same, partly in section.

Fig. 18 represents a vertical section on a larger scale, taken in the plane of the line XVIII—XVIII of Fig. 16, looking in the direction of the arrows.

Fig. 19 represents a detail vertical section of the second talc applying means.

Fig. 20 represents a detail vertical section of a modified form of rotary talc feeder.

Fig. 21 represents a detail elevation of the driving mechanism for the talc applying means, the pedestal of said means being shown in dotted outline.

Fig. 22 represents a plan view of the same, the pedestal of the talc applying means being shown in section.

Fig. 23 represents a similar view with the parts in another position.

Fig. 24 represents a detail horizontal section taken in the plane of the line XXIV—XXIV of Fig. 21.

Fig. 25 represents an elevation of the clutch mechanism, on a larger scale, for controlling the talc applying means, a portion of which is broken away to show other parts more clearly.

Fig. 26 represents a vertical section taken in the plane of the line XXVI—XXVI of Fig. 25, looking in the direction of the arrows.

Fig. 27 represents a detail transverse section through certain portions of the clutch mechanism with the parts in the position corresponding to the parts shown in Figs. 21 and 22.

Fig. 28 represents a similar view with the parts in another position, corresponding to the position which the parts assume, in Fig. 23.

Fig. 29 represents a detail side elevation of the speed controlling mechanism, a portion of the casing being broken away to show parts within.

Fig. 30 represents a horizontal section taken in the plane of the line XXX—XXX of Fig. 29, looking in the direction of the arrows.

Fig. 31 represents a vertical section taken in the plane of the line XXXI—XXXI of Fig. 29, looking in the direction of the arrows.

Fig. 32 represents a vertical section taken in the plane of the line XXXII—XXXII of Fig. 29, looking in the direction of the arrows.

Fig. 35 represents, on a smaller scale, a machine showing a modified form of take-off device, and Fig. 36 represents a similar view of still another modified form of take-off device.

Figure 9:
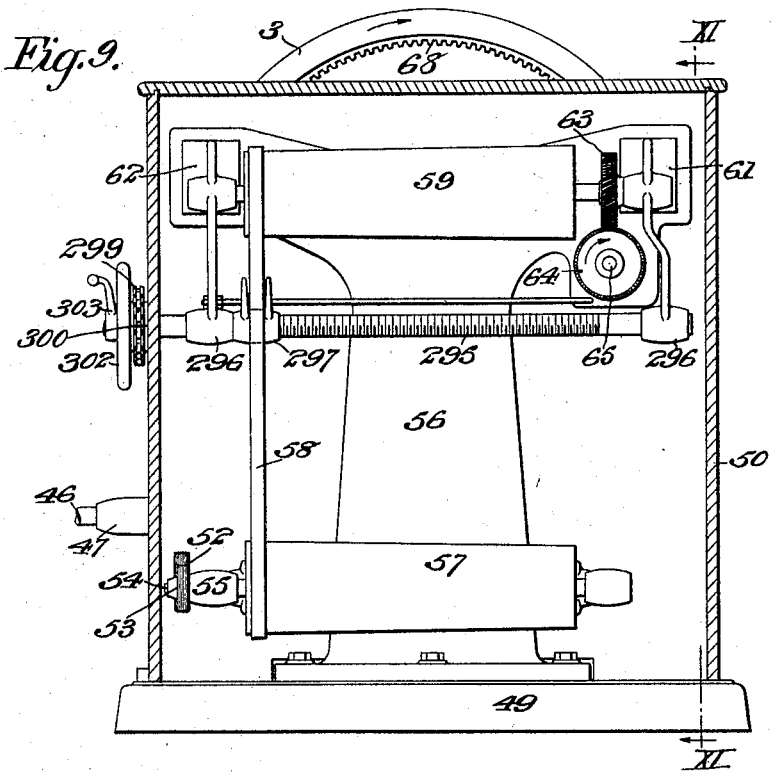
Fig. 9 represents a vertical section taken in the plane of the line IX—IX of Fig. 8.
Figure 10:
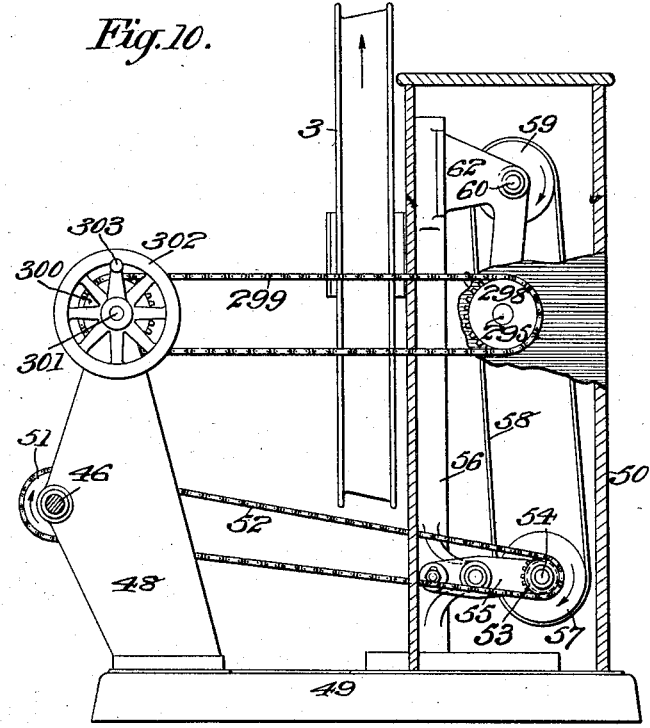
Fig. 10 represents an end elevation of the same, portions of which are broken away to show other parts more clearly.
Figure 11:
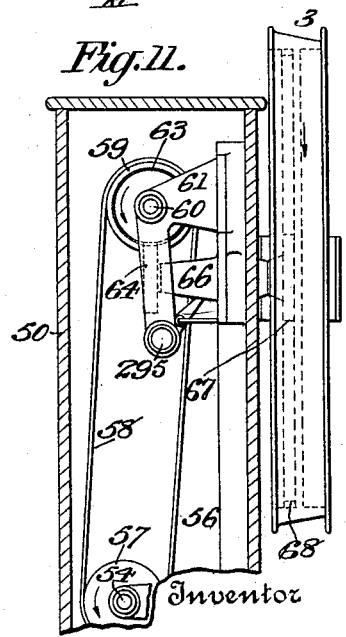
Fig. 11 represents a vertical section taken in the plane of the line XI—XI of Fig. 9, looking in the direction of the arrows.

Referring to Fig. 1, the head of a tubing or insulating machine is denoted by 1, as the said machine may be of any well known or approved form, it will not be further described herein. Insulated wire being ejected from the tubing machine is marked 2.

In the general operation of the machine, the material is received from the tuber by a take-up drum 3, around which the wire is coiled one or more times. On its way to the take-up drum 3, the wire passes through a talc applying apparatus, denoted generally by 4, which serves to coat the wire with a layer of talc, soapstone or the like. From the take-up drum 3 the wire is fed to and coiled in the pan 5. After the pan has been filled, the wire is severed and the pan may be placed in the vulcanizer for curing the material.

The main drive mechanism of the apparatus is housed in a casing 6 and is illustrated in Figs. 29 to 32 inclusive, to which reference is now made. The electric motor, which constitutes the main source of power, is represented by 7 and is suitably secured to the base of the casing 6. A belt 8 passes from the pulley on the end of the motor shaft 9 to a large pulley 10, fixed to the end of a shaft 11 which is journaled in supports 12, 13 upstanding from the base of the casing 6. This shaft 11 has a stepped-pulley 14 secured thereto, and a belt 15 leads from the said pulley 14 to a similar, but oppositely disposed, stepped-pulley 16, which is fixed to a shaft 17 that is journaled in bearings 18, 19 carried by supports 20, 21 upstanding from the base of the casing 6. The shaft 17 projects outwardly beyond the bearing 18 and has a pulley 22 fixed to its end from which a belt 23 leads to a pulley 24 that is secured to the projecting end of a shaft 25 which is journaled in bearings 26, 27 that are carried by the supports 12, 13. The belt 23 is crossed, so as to cause the pulley 24 to rotate in the opposite direction from the pulley 22. A cone 28 is secured on the shaft 25 and a belt 29 passes from the said cone to a similar, but oppositely disposed, cone 30 that is fixed on a shaft 31, journaled in the upper portions of the supports 20, 21.

An end of the shaft 31 projects through a large tapered bearing 32 which is secured to the face of the support 20 and projects through the side of the casing 6. Said end of the shaft 31 projects beyond the bearing 32 and carries a spiral gear 33 which meshes with another spiral gear 34 that is fast on the shaft 35 which is mounted in a bearing 36, supported in a housing 37 fixed to the support 20. One end of the shaft 35 carries a sprocket 38 which is connected to a similar sprocket 39 by means of a chain 40. The sprocket 39 is fast on a shaft 41, which is mounted in a bearing 42 that is carried by the housing 37. The other end of the shaft 41 is connected, by a universal joint 43, with a telescopic link 44, the other end of which link is connected, by a universal joint 45, with a shaft 46 which is journaled in a bearing 47 (Fig. 1) carried by a bracket 48, uprising from the base 49 of a casing 50 which encloses the drive mechanism for the take-up drum 3.

The drive mechanism for the said take-up drum is illustrated in Figs. 7 to 11 inclusive, to which reference may be had. The end of the shaft 46 which is not connected to the link 44 carries a sprocket 51 which is connected by a chain 52 with another sprocket 53 that is fixed on the end of a shaft 54 which is mounted in an adjustable bracket 55 that projects from a support 56 which is bolted to the base 49 of the casing 50. A cone 57 is fixed on the shaft 54, and a belt 58 runs from the said cone to a corresponding, but oppositely disposed, cone 59 that is carried by a shaft 60 which is mounted in brackets 61, 62 projecting from the upper part of the support 56. A spiral gear 63 is fixed on the shaft 60 and meshes with a similar gear 64 carried by a shaft 65 that is journaled in a bearing 66, carried by the support 56 and projecting through the side of the casing 50. The projecting end of the shaft 65 has a gear 67 fixed thereto, which meshes with an internal gear 68 fixed to the inner circumference of the take-up drum 3, which drum is mounted on a shaft 69 that projects from the support 56 and through the side of the casing 50.

From the foregoing description it will be seen that power is transmitted by the mechanism described, from the motor 7 to the take-up drum 3, around which latter the wire 2 is wound one or more times in order to be drawn under proper tension from the tubing machine 1 and fed to the pan 5.

While the wire 2 is passing from the tubing machine 1 to the take-up drum 3, it is subjected to a coat of talc or soapstone in order to prevent adjacent coils from adhering to each other in passing around the take-up drum, and in the pan. This talc applying mechanism has already been referred to as generally indicated by 4 (Fig. 1). It is more completely illustrated in Figs. 3 to 6 inclusive, to which attention is now directed, in addition to Fig. 1. The mechanism comprises a base 70 which is adjustably mounted on top of the casing 6 by four screws 71, that are threaded in bosses 72, projecting from the corners of the base 70. This feature of adjustability enables the device to be brought into perfect alinement with the tubing machine.

At the end of the base 70 adjacent the tubing machine, a lug 73 projects and acts as a support for a post 74 which carries a hollow head 75 that has a threaded aperture 76 adapted to receive a threaded guide 77. The inner end of the guide 77 is fitted with a removable tip 78, and it will be understood that similar tips having different sized openings may be fitted in the nozzle according to the diameter of the wire or other material being treated.

A hose 79 is threaded into the lower portion of the hollow head 75 and leads to a tank 80 which is adapted to be loaded with talc or the like, and is also connected, by means of a pipe 81, with a source of compressed air supply. A valve 82 in the pipe 81 serves to adjust the inflow of the compressed air, and it will be seen that, by opening the said valve, the compressed air will force the powdered talc up through the hose 79 into the hollow head 75. It will be observed that the head 75 surrounds the guide 77, so that a cloud of compressed air laden with talc is caused to surround the wire as it passes through the tip 78, and thereby provide it with a thorough coating of the talc dust or powder.

Two semicircular supports 83, 84 are bolted to the base 70 at each end thereof, and are steadied in their vertical position by a tie rod 85. Each of said supports is provided on its inner face with gear teeth, as clearly shown in Figs. 3, 4 and 5, for a purpose to be hereinafter described. Two similar plates 86, 87 are located between and adjacent to the supports 83, 84. Said plates are connected by a pair of tie-bolts 88, 89 and each has formed on it a curved tongue or rib 90, 91 which are fitted to travel in corresponding grooves 92, 93, formed in the inner faces of the supports 83, 84. To each of these plates are pivoted, as at 94 and 95, two bent arms 96, 97. The short ends of each pair of said arms engage each other by a loose tongue and groove connection, as indicated at 98, 99, so as to compel them to work in unison; while the long ends of the said arms are pivoted, as at 100, 101, to a cylindrical framework which surrounds the wire as it is being coated with talc.

This cylindrical framework is divided on its central longitudinal line so as to constitute two half portions, each of which includes a pair of semicircular end pieces composed of plates 102, 103, consisting of fibre or the like, which are fastened, as by screws 104, to skeleton members 105, 106. The said end pieces are connected by a plurality of tie-rods 107 which are reinforced intermediate the end pieces by skeleton members 108. The framework, as a whole, is surrounded by a thin material, preferably fabric, 109, which is secured to the end pieces by pins 110 that project at intervals from the peripheries thereof, and by retractile coil springs 111, which are secured to the peripheries of the end pieces and lie in grooves formed therein, as clearly indicated in Fig. 6. This method of fastening permits the ready removal of the fabric 109 when desired.

The end pieces 102, 103, 105, 106, as well as the reinforcing members 108, are provided with central hubs 112, 113, 114, and a conduit 115 is fitted in the hubs 112, 113, and has one end in register with a band 116 which surrounds the inner end of the head 75; while a slidable collar 117 may be manually operated so as to surround the end of the conduit 115, for holding it in position with respect to the head 75 or for clearing the conduit so as to permit it to have lateral movement with respect to the head 75. The two positions of this collar are indicated in full and dotted lines in Fig. 5. It will be understood that the hubs 112, 113, 114, as well as the conduit 115, are each formed in two halves, as is the case with the cylindrical framework of which they constitute parts. The wire being treated passes through the guide 77 and tip 78, as already indicated, and it is thence led through the conduit 115 and hub 114, to the take-up drum 3. It is while thus passing through the conduit 115 that the coating of talc is applied and, in order to provide for a somewhat even distribution of the talc powder (which is in the form of a dust cloud under the influence of compressed air), a plurality of felt segments or half washers 118 are located in staggered order in the conduit 115. These serve to prevent the incoming talc powder from being at once forced to the end of the conduit furthest away from the tip 78, and thereby provide a more even and adequate subjection of the wire passing through the conduit, to the talc. A split felt washer 119 is inserted in the hub 114 at the point where the wire leaves the talc applying mechanism in order to prevent undue escape of powder at this point.

It will, of course, happen that a considerable amount of the talc powder will escape through the conduit 115 and into the large cylindrical framework which surrounds it. This fugitive powder will be trapped by the fabric walls of the said cylindrical framework and it will occasionally be necessary to empty the latter, owing to the accumulation. It is for this purpose that the cylindrical framework is made in two halves, as already described. These two halves are hinged to each other at each end, as shown at 120, and means is provided for inverting and opening the said two halves. This means comprises a shaft 121 which is mounted in bearings 122, carried by the plates 86, 87. On one end of the shaft 121 is a hand wheel 123, and on each end is a pinion 124, the one on the end away from the hand wheel being secured in place by a wing nut 125. This pinion 124 meshes with the teeth formed on the inner face of the support 83 so that, by turning the hand wheel 123, the pinion will be caused to travel along the inner face of the said support, whereby the plates 86, 87, which have the tongue and groove engagement with the supports 83, 84 will be caused to slide along the said supports. This movement of the plates will, of course, carry the arms 96, 97 and, by reason of the fact that the said arms are secured to the two halves of the cylindrical framework, the latter will be inverted after the pinion 124 has been moved nearly to the upper part of the support 83. At this position, a downward pressure, exerted manually upon the short ends of the arms 97, at the point 99, will cause the long ends of the said arms to separate and thereby open the two halves of the cylindrical framework as indicated in Fig. 4. This opening will, of course, empty out the accumulated talc powder, after which the cylindrical framework may be cleaned and the parts reversed so as to bring it back to operative position.

As already stated, after the wire leaves the take-up drum 3 it is fed into the pan 5. The mechanism for performing this function will now be described, reference being had to Figs. 1, 29 and, more particularly, to Figs. 12, 13 and 14.

The shaft 35 (Fig. 29) is connected by a universal joint 126 to a telescopic shaft 127, which is connected by another universal joint 128 (Fig. 1) with a shaft 129 which is mounted in a bearing 130, carried by a pedestal 131 that is mounted on a base 132, which base supports the pan 5 and adjacent parts.

A cylindrical gear housing 133 is mounted substantially centrally of the base 132, which housing also serves as a bearing support for a number of shafts. The shaft 129 projects from its bearing 130, through the housing 133 and has an end journaled in the latter. This end of the shaft 129 carries a bevel gear 134, which meshes with a large bevel gear 135 that is rotatably mounted on a vertical spindle shaft 136 which has its lower end supported by a step bearing 137. A pair of similar shafts 138, 139 have their outer ends journaled in bearings 140, 141, mounted on the top of stanchions 142, 143 that are secured to the upper surface of the base 132 and the inner ends of said shafts are journaled in the housing 133 as indicated at 144 and 145. The said ends of these shafts carry bevel gears 146, 147 which are similar to the bevel gear 134 on the shaft 129 and also mesh with the large gear 135. This geared connection just described causes the rotation of the shaft 129 to impart similar rotation to the shaft 139.

On each of the shafts 129, 138 and 139, there is mounted friction gears or rolls of fibre, leather or other similar material 148, 149, 150, which friction gears are fixed against rotary movement but adapted for longitudinal movement upon said shafts, by means of long splines 151, 152, 153.

The pan support is denoted by 154 and consists of a circular member which has an elevated central portion in the shape of a truncated cone to which is bolted a bearing hub 155 that is keyed to the upper end of the vertical shaft 136. This pan support 154 rests upon and is driven by the friction gears 148, 149, 150, and the latter are arranged to be moved longitudinally along their shafts so as to drive the pan support at a speed coordinated to that of the feed of the wire from the take-up drum 3. As already indicated, the pan 5 which rests upon the pan support 154 is in the form of an annulus, and the wire is coiled therein to prepare it for vulcanization. As will be clear, the coils become larger as the wire is laid in a movement from the center of the pan towards its periphery and becomes smaller as the next layer of wire is being coiled from the outer edge of the pan towards its center. Therefore, any given speed of rotation of the pan would vary with respect to a fixed speed of feed of the wire because of the ever changing diameter of the coils being laid. For this reason the pan support must have a differential speed of rotation so that its surface speed at the point where the wire is being laid at any instant will correspond with the rate of speed on which the wire is being fed to the pan. To obtain this result the friction gears 148, 149, 150 are caused to move so that, at any time, they engage the underside of the pan support 154 at points exactly beneath the coiled wire being laid, at that instant, in the pan.

Figure 12:
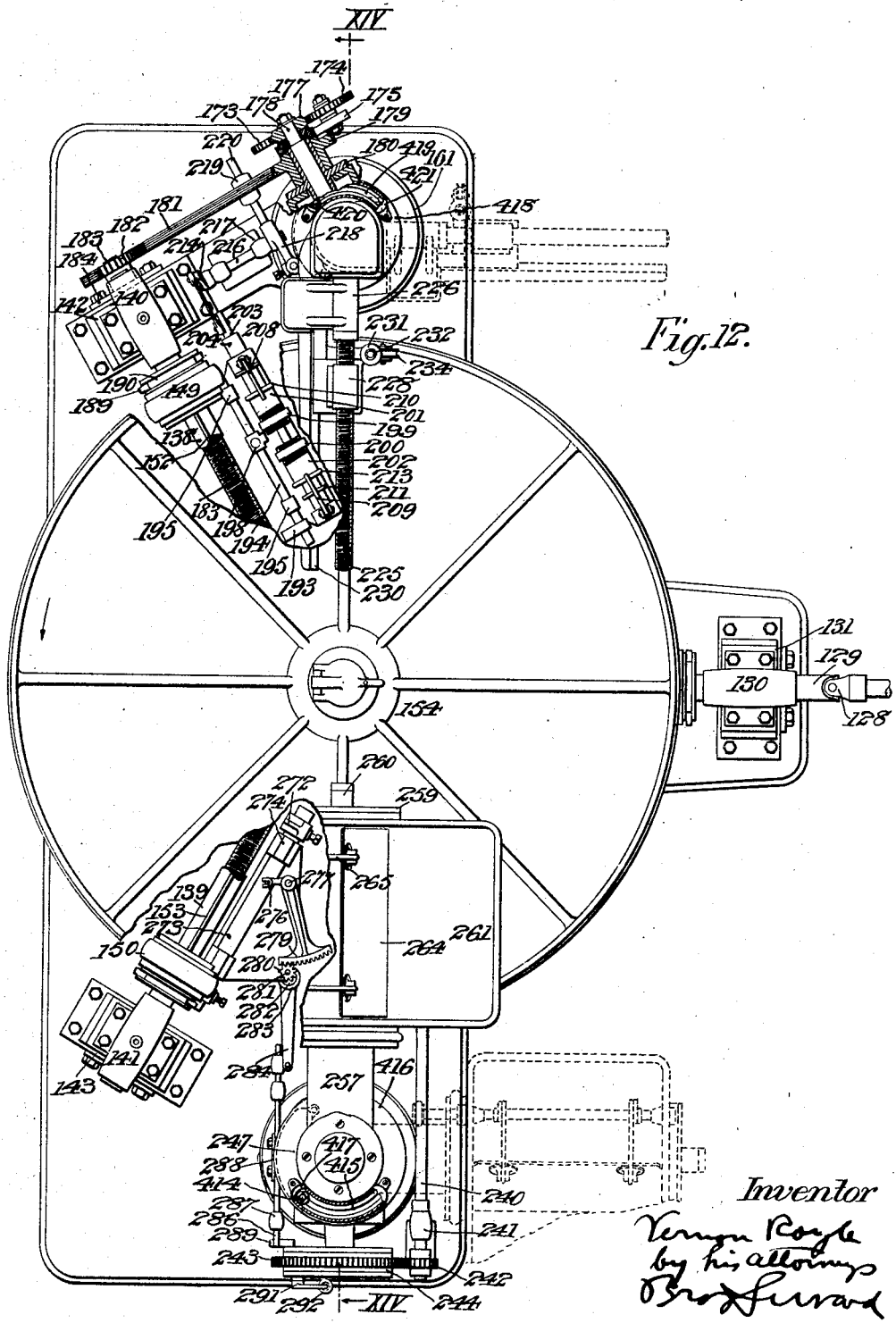
Fig. 12 represents a plan view of the means for rotating the pan and its adjacent mechanism, certain portions being broken away to show the parts below, the second talc applying means and the wire feeding means being shown in dotted outline out of operation.
Figure 34:
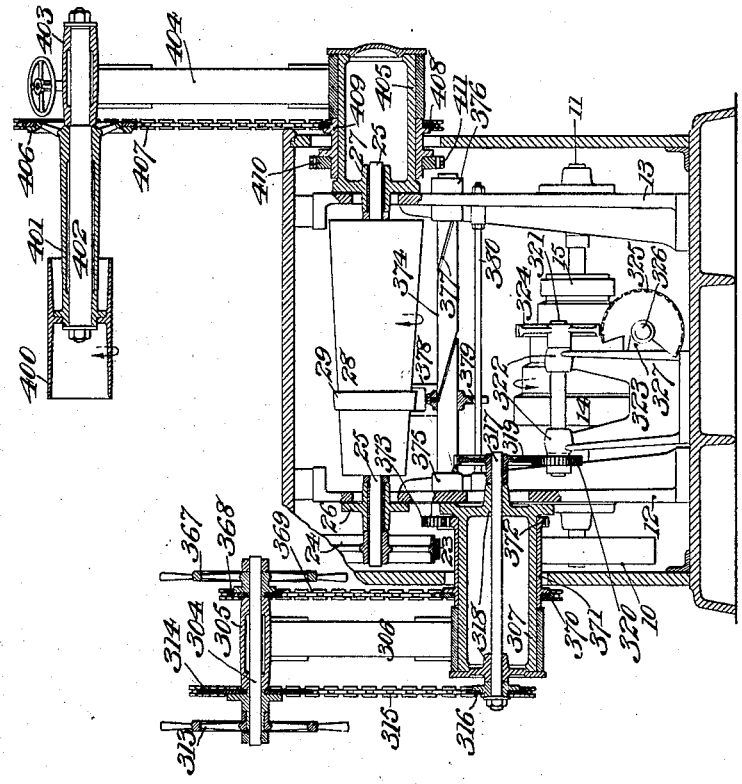
Fig. 34 represents a detail vertical section through certain of the parts shown in Fig. 33.
Figure 33:
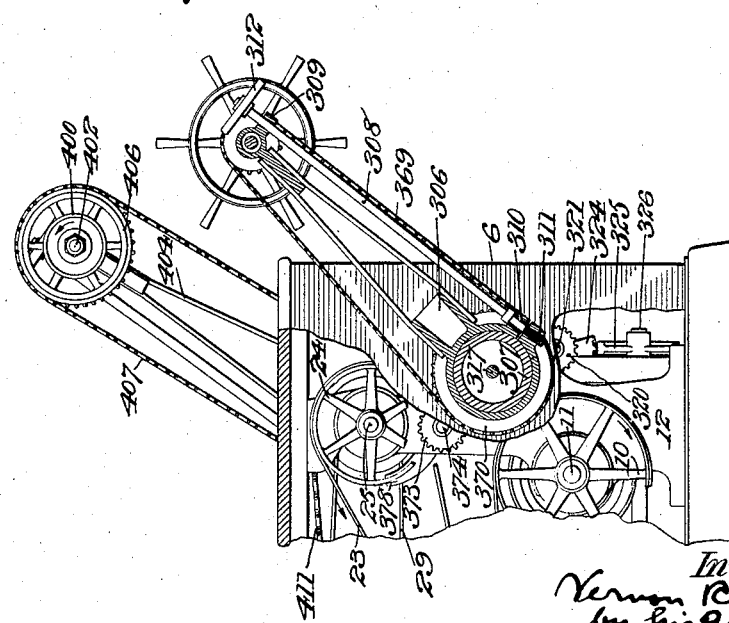
Fig. 33 represents a detail side elevation of one end of the speed controlling mechanism, a portion of the casing being broken away to show the parts within, other portions being shown in section, and certain of the parts in different positions from that shown in Figs. 29 to 32 inclusive.

The movement of the friction gears 148, 149, 150, just described is accomplished by the following mechanism reference being had to Figs. 16, 17 and 18, in addition to Figs. 12, 13 and 14.

A bevel gear 156 is pinned to the upright shaft 136 and meshes with a bevel gear 157 that is keyed on the end of a shaft 158, one end of which is carried by a bearing 159 bolted to the housing 133. The other end of shaft 158 fits in a bearing 160 that is bolted to a stanchion 161 mounted on the base 132. This end of the shaft 158 carries a bevel gear 162 that meshes with a pair of bevel gears 163, 164 which are loosely carried on a vertical shaft 165 that is mounted for rotation in bearings 166 and 167, fixed at the bottom and intermediate portions of the stanchion 161. A clutch member 168 is keyed for sliding movement on the shaft 165 so as to bring it into engagement with mating clutch members secured to the inner faces of the gears 163 and 164. Thus the vertical shaft 165 will be rotated in the one direction or the other according to the way the clutch member 168 is locked to the gear 163 or the gear 164.

A bevel gear 169 is fixed to the upper part of the shaft 165 and meshes with another gear 170 that is carried by a shaft 171 that is mounted in a bearing 172 which is secured to the outside of the stanchion 161. A spur gear 173 is fixed to the end of the shaft 171 and meshes with another gear 174 that is removably mounted at the end of an adjustable arm 175 which has a split hub that embraces a portion of the bearing 172, as clearly indicated at 176 (Fig. 17). The removability of the several gears 173, 174, 177 and adjustability of the arm 175 enables gears of different sizes to be located at this point in order to vary the speed of the subsequent drive, which is desirable when the machine is about to operate upon a wire or a tube of a different diameter from that being handled. The gear 174, in turn, meshes with a gear 177 which is fixed on a shaft 178 and fast to a sprocket 179, which sprocket is rotatably mounted on a bearing 180 which is secured to the outer face of the stanchion 161 and carries the shaft 178. A chain 181 connects the sprocket 179 with another sprocket 182 that is fixed on a shaft 183 having one end mounted in a bearing 184, that is carried by the stanchion 142 below the bearing 140. The other end of the shaft 183 is carried in a bearing 185 fixed in the housing 133. This end of the shaft 183 has a bevel gear 186 fixed thereto which meshes with a large gear 187 that is rotatably mounted on the vertical shaft 136 and, in turn, meshes with the other two gears similar to the gear 186 that are carried on two other shafts, like the shaft 183, for operating the other two fibre friction gears 148 and 150 in identically the same manner as in the case of the friction gear 149.

The shaft 183 is screw-threaded and has mounted thereon an interiorly threaded carriage 188, the upper part of which is provided with a yoke 189 that enters a groove 190 which is formed in the friction gear 149. It will be seen from this description that rotation of the shaft 183 will slide the carriage 188 longitudinally thereupon and hence impart similar movement to the friction gear 149 on the shaft 138. The carriage 188 has a lug 191 (Fig. 17) projecting laterally therefrom and adapted to travel between and alternately engage two lugs 192, 193, (Fig. 16). The said lugs 192, 193 are adjustably mounted on a slidable rod 194 which is carried in brackets 195 that project from a box 196 that is mounted on the top of a post 197, which uprises from the base plate 132. Another lug 198 is adjustably secured to the rod 194 intermediate the lugs 192, 193 and is adapted to travel between and alternately engage collars 199, 200 that are adjustably threaded on recessed sleeves 201, 202 that are mounted for longitudinal movement on another slidable rod 203 which is journaled in the box 196 through the intermediation of two recessed sleeves 204, 205 that are pinned to the rod 203. Two expansion coil springs 206, 207 surround the rod 203 and are housed within the sleeves 201, 202, 204, 205. Two gravity operated latches 208, 209 are pivoted at opposite ends to the box 196 and are shouldered for engagement with flanges 210, 211 integrally formed upon the sleeves 204, 205. When the latch 209 is in engagement with the flange 211, as indicated at the left in Fig. 18, it prevents the sleeve 205 and hence the rod 203 from moving to the left in said figure. A similar position of the latch 208 with respect to the flange 210 prevents movement of the rod 203 to the right. The latches are adapted to be moved upwardly out of engagement with the flanges by the rims 212, 213 which are formed integral with the sleeves 201, 202 when the latter are moved with respect to the latches.

From the immediately foregoing description it will be seen that, assuming clutch member 168 to be engaged with gear 163, shaft 183 will be rotated so as to cause the carriage 188 to travel inwardly thereon. During this inward movement of the carriage its lug 191 will finally engage lug 193 on rod 194, and move said rod inwardly, or to the left, as indicated in Fig. 14. This movement of rod 194 will move its lug 198 until it contacts with collar 200, thereby moving sleeve 202 to the left in Fig. 18. This movement of sleeve 202 will cause its rim 213 to engage the rounded end of latch 209, and to simultaneously compress spring 207. Continued movement of sleeve 202 will eventually lift the latch 209 out of engagement with flange 211. At this juncture spring 207 has been considerably compressed and, immediately latch 209 releases flange 211, spring 207 will force sleeve 205, and hence rod 203 rapidly to the left in Fig. 18. This movement of the rod will, of course, move rim 212 and flange 210 to the left and permit latch 208 to fall down into locking engagement with flange 212. The rod 203 has one end connected to a rocker arm 214, as indicated at 215, which arm is pivoted at 216 in a standard 217 mounted on the base 132. A dog 218 projects laterally from the arm 214 and enters a recess in a slide 218* which is mounted on a post 218 and has a yoke 218* which rides in a groove in the clutch member 168 on the shaft 165. Thus as rod 203 is moved to the left in Fig. 18, as just described, it will swing arm 214 and thereby move clutch member 168 into engagement with gear 164, thereby reversing the movement of shaft 165 and hence reversing the movement of shaft 183. This reversal of movement of shaft 183 will, of course, at once cause the carriage 188 to start moving outwardly thereupon, carrying the friction gear 149 along with it. Near the end of this outward movement of carriage 188, its lug 191 will engage yoke 192, thereby moving shaft 194 in the opposite direction and causing its lug 198 to engage rim 212, compressed spring 206, release latch 208 and permit spring 206 to move arm 214 in the opposite direction, thereby sliding clutch member 168 so as to again reverse the direction of rotation of the shaft 165. In order to make the action of the arm 214 smooth and steady, there is provided a counterbalance consisting of a weight 219 adjustably mounted on arm 220 which projects from the base of the arm 214.

It will be understood that the movements just described will be continuously and automatically repeated as long as the machine is in operation, and that the friction gear 149 will thereby be caused to travel inwardly and outwardly in contact with the under surface of the pan support 154 and coincident with the laying of the spirals of the wire in the pan 5, thereby ensuring that the movement of its surface at the point where the wire is being laid therein shall be exactly equal at all times, to the rate of feed of the wire.

It is necessary to provide means for feeding the wire radially inwardly and outwardly during its tangential movement for coiling it in the pan. This feeding is accomplished by a mechanism which is clearly shown in Figs. 13, 14 and 15, and will now be described. A gear 221 is fixed to the lower end of a vertical shaft 222 which is mounted in the top of the pedestal 161, said gear 221 being in mesh with a gear 178* on shaft 178. Another gear 223 is fixed to the upper end of the shaft 222 and mates with a gear 224 that is fixed on a threaded shaft 225 projecting inwardly in a radial direction over the pan 5 and journaled in a bearing 226 that is formed in the upper part of a bracket 227 which projects laterally from the stanchion 161.

A carriage has its upper portion 228 threaded on the shaft 225, and its lower portion 229 fashioned to fit the dovetailed rib 230 formed on the bracket 227. Said carriage supports a housing 231 in which is mounted a gravity operated plunger 232 which carries two grooved pulleys 233, 234 at its lower end. This plunger and pulleys are shown in elevated and depresed positions in full and dotted lines in Fig. 14.

The wire 2 coming from the take-up drum 3 is laid over pulley 233 and under pulley 234 (Fig. 15) while pulleys are at either the outer or inner edge of the pan 5. When the machine is set in operation, the movement of the parts just described as actuating the friction gear 149, will operate the chain of mechanism connected to the shaft 225, thereby rotating the latter and causing the carriage 228, 229 to slide upon it and upon the dovetailed rib 230, thus moving the pulleys 233, 234 inwardly and outwardly in a radial direction with respect to the pan 5, as the case may be, which movement of the pulleys will guide the wire into its correct coiled position. The guide pulley 234 and points of contact of the friction gears 148, 149, 150 with the pan support 154 will maintain a vertical relationship with respect to the coil of wire being laid in the pan throughout their entire movement.

The apparatus also includes mechanism for providing a shower of talc, soapstone or the like, onto the coiled wire in the pan 5 to provide a bed for the next succeeding layer. For accomplishing this purpose, there is provided a hopper filled with the desired powder that is caused to intermittently discharge into the pan 5, said discharge taking place at the end of each inward and outward movement of the friction gears 148, 149, 150. The mechanism referred to is shown in Figs. 12, 13 and 14; and in detail in Figs. 12 and 21 to 28 inclusive. It is constructed as follows:

A bevel gear 235 (Fig. 14) is mounted on a shaft 236 which is journaled in a bearing 237 that is bolted to the housing 133. This gear 235 meshes with the gear 156 (previously described) and serves to drive a spur gear 238 that is fixed to the other end of the shaft 236. The gear 238 meshes with a pinion 239 (Fig. 13) which is secured to one end of a shaft 240 that is mounted in brackets 241, secured to the base 132. The other end of the shaft 240 carries a pinion 242 that is in mesh with a ring gear 243 which is carried on a disc 244 (Figs. 14 and 26) that is keyed to a shaft 245 mounted in a bearing 246 which is bolted to the side of a stanchion 247 that is fast on the base 132. The other end of shaft 245 carries a bevel gear 248 which meshes with a similar gear 249 that is fixed on a vertical shaft 250 which is journaled in bearings 251 and 252 formed at the bottom and top of the stanchion 247. The upper end of shaft 250 has a bevel gear 253 which meshes with a corresponding gear 254 that is fixed on the end of a shaft 255 which is journaled in a bearing 256 that is bolted to the outer face of a lateral extension 257 projecting from the top of the stanchion 247. To the bearing 256 is bolted a casting 258 (Fig. 13), which has an outer end plate 259 secured to it, the said end plate having a hub 260 which serves as an outer bearing for the shaft 255. This casting 258 receives the upper or intake portion 261 of the hopper as well as the lower or outlet portion 262 thereof. These two portions 261, 262 may conveniently be formed of sheet material and forced into engagement with the casting 258, in which position they may be secured by suitable means.

A cylindrical feed wheel 263 is journaled on the shaft 255 and housed within the casting 258. It will be seen by reference to Fig. 19, that powdered material placed in the upper portion 261 of the hopper will pass down onto the plates of the wheel 263 and that, upon rotation of the said wheel as indicated by the arrow, a certain amount of the powdered material will be discharged through the outlet 262. This outlet is immediately above the pan 5, so that the falling talc comes down upon the layer of wire coiled therein. A damper 264 is slidably mounted in the portion 261 of the hopper and controlled by connecting rods 265 and a bell crank lever 266, which latter is pivoted at 267 and has a hand lever 268. The operation of this hand lever will cause the damper 264 to permit more or less of the material to fall upon feed wheel 263.

This rotation of the feed wheel 263 is caused to occur intermittently at each end of the inward and outward travel of the friction gears 148, 149, 150 so as to cause the shower of talc to come down upon each completed layer of wire coiled in the pan. The intermittent operation of the wheel 263 is controlled by the movement of the carriage which affects the reciprocatory movement of the friction gear 150. As already described, this carriage is constructed and operated like the carriage 188, but, for convenience of the present description it will be denoted by 269 (Fig. 14). The details of the structure about to be described are clearly shown in Figs. 22 to 28. The carriage 269 has a lug 270 which projects laterally therefrom and is designed to travel between lugs 271, 272 that are adjustably secured on a slide bar 273 which is mounted in a box 274 carried on top of a base 275 mounted on the base 132. The slide bar 273 has a pin and lock engagement 276 with the short end of a bell crank that is pivoted at 277 on top of a bracket 278 which projects laterally from the post 275. The other arm of the bell crank carries a sector gear 279 which meshes with a pinion 280 that is fixed on a pin 281 which is supported in the bracket 278 and carries an eccentric 282 that acts within the bored end 283 of an arm 284. The other end of the arm 284 is pivoted to a sleeve 285 that is fixed to a slidable locking pin 286 which is carried in bearings 287 formed in a bracket 288 bolted to the side of the stanchion 247. The other end of the locking pin 286 is adapted for engagement with the curved extremity 289 of a catch which is pivoted at 290 in the disc 244. The other end of the pivot 290 carries an arm 291 to which is secured a retractile coil spring 292 that has its other end anchored at 293 on the said disc 244. The aperture which receives the pin 290 is formed partly in the ring gear 243 and partly in the disc 244, and the intermittent portion of the said disc is semi-circular in cross section, as clearly indicated at 294 (Fig. 27). Thus it will be seen that in one rotary position (Fig. 27) the pin 290 will permit the ring gear 243 to travel around on the disc 244, without rotating the latter, while in another position (Fig. 28) the pin 290 will lock the ring gear 243 to the disc 244, thereby causing the two to rotate together. The spring 292 normally tends to throw the pin 290 into such position that the ring gear 243 and disc 244 will be locked together, and it is the office of the locking rod 286 to intermittently hold the latch 289 in such position that the pin 290 will not lock the parts 243 and 244 together, as indicated in Fig. 27. This result occurs when the locking rod 286 is pressed to the left (Fig. 23) so as to come into the path of the latch 289. At this juncture the rotary movement of the said latch as it travels around with the parts 243 and 244, will cause the end of the rod 286 to force it down into the position shown in Fig. 27, against the tension of the spring 292, thereby permitting the ring gear 243 to slide freely on the disc 244.

It will be seen that, by virtue of the construction just described, the arrival of the carriage 269 at the limit of either its inward or outward travel (which is coincident with the arrival of the friction gears 148, 149, 150 at the same points), will cause its lug 270 to engage the one or the other of the lugs 271, 272, thereby actuating the sector and pinion 279, 280 and hence, through the action of the eccentric 282, reciprocate the locking rod 286. As the latter is thrust to the left (Fig. 23) in contact with the latch 289, the ring gear 243 will be permitted to slide without rotating the disc 244, and hence the parts which operate the feed wheel 263 will remain idle. As soon as, however, the eccentric 282 moves sufficiently to withdraw the rod 286 from the latch 289, the spring 292 will cause the pin 290 to lock the ring gear 243 and disc 244 together, thereby through the train of mechanism already described, turning the feed wheel 263 and causing the talc to be deposited upon the wire coiled in the pan. The parts are so timed that the shower of talc can well occur throughout at least one full rotation of the pan 154, so as to ensure a complete coating of the layer of coiled wire, before the next layer is placed thereon.

It is very important that the feed from the take-up drum 3 to the pan 5 should always be at the same relative rate of speed and, as the friction gears 148, 149, 150 will wear and thereby reduce somewhat the speed of rotation of the pan support which rests upon them, it will be necessary from time to time to slightly alter the rotative speed of the drum 3. This change in speed is accomplished by mechanism which is housed within the drum casing 50 and includes a threaded shaft 295 that is mounted in bearings 296 which are supported from the brackets 61, 62. A belt shifter 297 is threaded on to the shaft 295 and engages the belt 58 as clearly shown in Fig. 9. The shaft 295 projects through the side of the casing 50 and has a sprocket 298 fixed thereon which is connected, by means of a chain 299 with another sprocket 300 that is fast to a short shaft 301 which is mounted at the top of the bracket 48 and carries a hand wheel 302 with a lock nut 303. It will be clear that by turning the hand wheel 302 the belt will be shifted slightly on the cones 57, 59, thereby changing the speed of rotation of the drum 3. The lock nut 303 serves to secure the adjustment in any desired position.

In view of the fact that the apparatus is designed to be used in connection with tubing machines the rate of output of which latter will vary, it is highly desirable to provide means for changing the speed of operation of the apparatus without changing the relative speed of operation of the different functional parts. This change speed mechanism is carried by or housed within the casing 6, and is clearly shown in Figs. 1, 2, 29, 30, 31, 32, 34.

A shaft 304 is mounted in a bearing 305 carried at the top of an adjustable arm 306 that has a split hub embracing a boss 307 which is bolted to the support 12. An adjusting rod 308 is carried in bearings 309, 310 at the top and bottom of the arm 306 and is threaded into the split hub at 311 in order to lock the arm 306 in any desired adjustment on the boss 307. A hand wheel 312 at the top of the rod 308 serves as a convenient means for manipulation thereof.

The shaft 304 carries a hand wheel 313 which is rotatably mounted thereon and fixed to a sprocket 314 that is connected by means of a chain 315 with another sprocket 316 which is fixed to a shaft 317 mounted in bearings 318 at each end of the boss 307. The other end of the shaft 317 has a gear 319 fast thereon that meshes with a gear 320 fast on a shaft 321 mounted in bearings 322 formed at the top of a bifurcated post 323 supported by the base of the casing 6.

On the other end of shaft 321 is a spiral segment 324 that mates with a spiral segment 325, fixed on a shaft 326 which is journaled in a bearing 327 carried by the post 323 and another bearing 328 (Fig. 29) formed in a post 329.

The shaft 326 has a box cam 330 (Fig. 31) fixed thereon that is engaged by a roller 331 carried at the joint of links 332 and 333, the former of which has its other end pivoted at 334 in another bracket uprising from the base of the casing 6 while the latter has its other end pivoted at 335 to an arm 336 that is fulcrumed at 337. The upper end of arm 336 is pivoted at 338 to an arm 339 which is, in turn, attached to a belt shifter 340 that engages the belt 15.

The belt shifter 340 is slidably mounted on a rod 341 which is supported in the top of a post 342 uprising from the base of the casing 6. A guide rod 343 is supported at one end in a post 344 projecting from the side of the post 342 and at the other end in a brace 345 fixed at the end of the rod 341. A lug 346 extends from the shifter 340 and is bored to slide upon the guide rod 343, which latter thus serves to steady the belt shifter in its movement and prevent it from turning on the rod 341.

It will be clear that when the cam 330 is operated by its shaft 326, the belt shifter mechanism will be actuated so as to move the belt from one diameter to another on the stepped pulley 14. In shifting the belt it is, of course, necessary that it should also be moved on the corresponding stepped pulley 16, and it is desirable, if not necessary, that one end of the belt should be shifted a little in advance of the other. Therefore, the mechanism has been arranged so that the shifted operation on the stepped pulley 14, just described, will take place positively and slightly in advance of a similar shifting movement of the belt on the stepped pulley 16.

The shifting of the belt on the pulley 16 is likewise accomplished by rotation of the shaft 326 through the initial operation of the hand wheel 313 of the mechanism described as connecting the two. The connections for shifting the belt on the pulley 16 are as follows: A collar 347 (Fig. 30) is fixed on the shaft 326 and has a lug 348 to which is secured one end of a torsion spring 349 which surrounds the shaft 326 and has its other end fixed to a disc 350 (Fig. 32) as indicated at 351. To this disc 350 is adjustably secured a box cam 352 in which travels a roller 353 carried on the end of an arm 354 pivoted at 356 in a bracket upstanding from the base of the casing 6. The arm 354 is connected by a link 356 to an arm 357 which is also pivoted at 358 in a bracket on the base of the casing 6. The upper end of the arm 357 is pivoted to a link 359 which is connected to a belt shifter 360 that also embraces the belt 15. This belt shifter 360 is slidable on a rod 361 which is carried in the top of a post 362 upstanding from the base of the casing 6; while a guide rod 363 is supported at one end in a bracket 364 at the top of the post 362, and at the other end in a brace 365 carried by the rod 361. An apertured lug 366 projects from the belt shifter 360 and embraces the rod 363 so as to guide the shifter in its movement and prevent it from rotating on the rod 361.

As a result of the mechanism just described, the rotation of the shaft 326 will impart a tension to the spring 349 so that it will move the cam 352 which, in turn, will actuate the shifter 360 through the intermediate link already described, thereby shifting the belt 15 on the stepped pulley 16. It will be observed that the shifting of this belt, first on the pulley 14 and then on the pulley 16 is due essentially to the fact that the cam 330 is positively and immediately moved upon rotation of the shaft 326, while the cam 352 is not moved until a sufficient tension has been developed in the spring 349 by rotation of the shaft 326. The movement of the cam 352 is limited by means of a pin 350* carried by the disc 350, which pin is arranged to engage a stop 326* fast on the shaft 326.

In shifting the belt 15 in the opposite direction from that above described, it is desired to first move the belt on the pulley 16. In this movement the shaft 326 upon being rotated will actuate the stop 326* which in turn transmits its motion to the pin 350* on the disc 350, which moves the cam 352 and hence the shifter 360. In this instance, the cams 352 and 330 will move together, but owing to the operating faces on the cams, the roller 331 will be caused to dwell in the cam 330 during a part of the movement of the cam 352, thereby allowing the belt 15 to be first shifted from the pulley 16 before the cam 330 actuates the shifter 340.

It will be understood that the changed speed just described is somewhat abrupt, since it moves the belt, on each pulley, from one definite diameter to another. In order to compensate for this comparatively abrupt change in speed and permit similar variations, the apparatus includes means for shifting the belt 29 on the cones 28 and 30. This means includes a hand wheel 367 (Fig. 34) which is freely mounted on the shaft 304 and fast to a sprocket 368 that is connected, by a chain 369 with a sprocket 370 fixed to a rotatable sleeve 371 on the boss 307. This sleeve 371 carries a gear 372 which meshes with a gear 373 fixed on a shaft 374 which is journaled at 375 and 376 in the supports 12, 13. The shaft 374 has a spiral groove 377 and carries a belt shifter 378 which has a finger engaging the groove 377 in order to cause the shifter to move longitudinally on the shaft as the latter is rotated. The shifter also has a slotted lug 379 which embraces a guide rod 380 that has its ends fixed in the supports 12, 13; which arrangement prevents the shifter from turning on the shaft 374. It will be understood that the shifter embraces the belt 29, and that this movement on the shaft 374 will slide the belt on the cones 28 and 30 so as to change the relative speed of rotation thereof.

From the foregoing description it will be evident that the operator, by manipulating the hand wheels 313 and 367 can change the speed of the apparatus as an entirety either in the way of making it run faster or slower, and to any extent desired, so as to bring about exact compliance with the rate at which the material to be treated is being fed from the tubing machine; and that this alteration in the speed of the apparatus will not in any respect disrupt the perfect coordination of relative speed of the functional parts.

In giving the foregoing detailed specification, reference has frequently been made to operating upon wire. However, as indicated at the outset, the apparatus is also designed to take care of tubing, and there are provided modifications in order more perfectly to handle the tubing which, as distinguished from wire, is hollow. These modifications are represented in assembly in Figs. 35 and 36, as also illustrated in part in Figs. 1, 2 and 29 to 34 inclusive. They relate chiefly to the mechanism for feeding the tubing from the tubing machine to the pan. In the modified form shown in Fig. 35 the take-up drum 3 and connected parts are entirely eliminated, and there is substituted therefor a conveyor belt which will now be described. The belt is denoted by 381 and surrounds a pair of pulleys 382, 383. The pulley 382 is carried in an L-shaped support 384 that is mounted for horizontal adjustment by a bolt and slot engagement with a bracket 385, which latter is mounted for vertical adjustment on a post 386 that rests on a plate 387 intermediate the casing 6 and the pan supporting and actuating apparatus.

The pulley 383 (Fig. 32) is carried by a shaft 388 which is journaled in a bearing 389 at the top of an arm 390 which has a split hub that embraces a boss 391 which is secured to the support 21. A hand wheel 392 is fixed at the upper end of a rod 392* which is designed to clamp the split hub of the arm 390 on the boss 391 so as to hold the arm in any desired position. This clamping structure is the same as that described in connection with the arm 306, so that it is not deemed necessary to illustrate or describe it further. The end of the shaft 388 opposite the pulley 383 has a sprocket 393 fixed thereto, from which a chain 394 runs to a sprocket 395 that is fast on a protruding end of the shaft 31 of the cone 30. It has previously been described that the shaft 31 is rotated by the driving mechanism, so that it will be understood that the connections just described serve to rotate the belt pulley 383 and hence cause the belt 381 to travel and feed the tubing 396 to the pan. This belt also serves to draw the tubing through the first talc applying mechanism, which latter is constructed and operates as already described. In the case of tubing it is desirable to inject talc or soapstone into the interior thereof, so as to prevent adhesion of the walls at any point where the tubing may collapse. This is accomplished by means of a pipe 397 which leads from the compressed air and talc tank 80, into the head of the tubing machine, where it is injected by the action of the compressed air into the interior of the tubing as the latter is formed in a manner which is now well known to those skilled in the art.

The modified form shown in Fig. 36 is similar to that shown in Fig. 35, except that the mechanism for coating the exterior of the tubing with talc is eliminated. In this case there is a belt 398 which surrounds a pulley 399 that is the same as and mounted in the same way as the pulley 382. The pulley 383 and connected parts are moved out of the way by operating the hand wheel 392, and another belt supporting pulley is employed which is located nearer to the tubing machine. This pulley is marked 400 and is carried on a sleeve 401 which is rotatably mounted on a shaft 402 (Fig. 34) which has a bearing 403 at the top of an arm 404 which has a split hub that embraces a boss 405, which is secured to the support 13 and projects through the casing 6. The construction and means for adjusting the arm 404 is the same as that provided for the arms 306 and 390, so that it will not be further described. The sleeve 401 carries a sprocket 406 from which a chain 407 runs to a sprocket 408 that is fast on a sleeve 409 rotatable on the boss 405. A sprocket 410 is also fast on the sleeve 409 and is connected, by a chain 411 (Fig. 30), with a sprocket 412 fixed on the shaft 31. As already described, the shaft 31 is driven so that motion is imparted through the chain of mechanism described, to the belt pulley 400, in order to actuate the belt 398 and thus feed the tubing from the tubing machine to the pan.

It will be understood that, in connection with both the modified forms shown in Figs. 35 and 36, the powdered talc is applied to each layer of the tubing as it is coiled in the pan.

A further slight modification is represented in Fig. 20, which shows a talc feed wheel that corresponds with the wheel 263 in all respects, except that its blades, denoted by 413, are bent. It has been found that this form has some advantage under certain conditions as it tends to spread the talc more than the former wheel indicated by 263.

In order to remove the pan 5 from its position on the support 154, it is necessary that both the second talc applying means and the wire feeding means be swung out of operation, to the positions shown in dotted outline in Fig. 12. To accomplish this result, the stanchion 247 of the second talc applying means is divided into two sections, the upper section being arranged to be moved arcuately on the lower section and limited by a bolt and slot connection, of which the bolt 414 is screw threaded into the lower section and extends upwardly through the slot 415 in the flange 416 of the upper section. A cover 417 is removably secured to the flange 416 and serves to protect the head of the bolt and slot.

To swing the wire feeding means out of operation, the stanchion 161 is similarly divided into upper and lower sections, the upper sections being provided with a flange 418 having an arcuate slot 419 through which the bolt 420 passes and is threaded into the lower section of the stanchion. A cover 421 serves to protect the bolt and slot, and is removably secured to the flange 418.

As the functions which this apparatus performs are, though highly important, quite simple; and, as the operation of the various parts of the mechanism has been set forth in connection with describing the details thereof, it is not felt necessary to rehearse the operation of the machine since this would entail a lengthy description of the cooperation of the many parts and would amount, in substance, to repetition. It is believed that the operation of the machine will be fully distinct, upon reading the foregoing description, to anyone skilled in the art.

I desire it to be understood that various modifications can be resorted to in the form, construction and arrangement of the several parts, without departing from the spirit and scope of my invention, and that I do not intend to be limited to the details herein described, except as the same are set forth in the claims.

What I claim is:

1. Apparatus of the character described comprising, mechanism for supporting an annular pan adapted to receive material from a tubing machine, said mechanism including a rotatable member having an elevated central portion, a housing axially coincident with the central portion, a spindle within said housing for carrying said member, a gear surrounding said spindle, and driving elements connected with said gear for rotating the member by contact exterior to said housing.

2. Apparatus of the character described comprising, mechcanism for supporting a pan adapted to receive material from a tubing machine, said mechanism including a rotatable member, a housing axially coincident with the center of said member, a spindle within said housing for carrying said member, a power shaft leading into said housing, and driving elements operatively connected with said power shaft and radiating from said housing for rotating the member.

3. Apparatus of the character described comprising, mechanism for supporting a pan adapted to receive material from a tubing machine, said mechanism including a rotatable member, a housing axially coincident with the center of said member, a spindle within said housing for carrying said member, a main gear surrounding said spindle, a power shaft radially disposed with respect to said member and having an end leading into said housing, a gear on said end of the power shaft meshing with said main gear, radially disposed auxiliary shafts having their inner ends mounted in said housing and provided with gears also meshing with said main gear, and a device on at least one of said shafts for rotating said member.

4. Apparatus of the character described comprising, mechanism for supporting a pan adapted to receive material from a tubing machine, said mechanism including a rotatable member, a housing axially coincident with the center of said member, a spindle within said housing for carrying said member, a main gear surrounding said spindle, a power shaft radially disposed with respect to said member and having an end leading into said housing, a gear on said end of the power shaft meshing with said main gear, radially disposed auxiliary shafts having their inner ends mounted in said housing and provided with gears also meshing with said main gear, devices on said shafts for rotating said member, said devices being reciprocable on their shafts for varying the speed of rotation of the member, means for reciprocating the devices including radially disposed shafts having their inner ends mounted in the housing and provided with gears, a common gear surrounding the spindle in the housing and meshing with said last named gears, and a source of power applied to one of said last named shafts at a point exterior to the housing.

5. Apparatus of the character described comprising, mechanism for supporting a pan adapted to receive material from a tubing machine, said mechanism including a rotatable member, driving means for rotating the member, mechanism for reciprocating the driving means in a radial path with respect to the member, and means for determining the extent of movement of the driving means in each direction, said determining means being controlled by a device carried by the reciprocating means.

6. Apparatus of the character described comprising, mechanism for supporting a pan adapted to receive material from a tubing machine, said mechanism including a rotatable member, driving means for rotating the member, mechanism for reciprocating the driving means in a radial path with respect to the member, said reciprocating mechanism including a rotating shaft, means for reversing the direction of rotation of said shaft, and a slide on said shaft moved by the rotation thereof, said reversing means being controlled by a device carried by the slide.

7. Apparatus of the character described comprising, mechanism for supporting a pan adapted to receive material from a tubing machine, said mechanism including a rotatable member, driving means for rotating the member, mechanism for reciprocating the driving means in a radial path with respect to the member, means for determining the extent of movement of the driving means in each direction, said determining means being controlled by a device carried by the reciprocating means, and a guide for the material located above the rotary member, said guide being adapted to reciprocate radially of the member in coincidence with the driving means and being governed by the means for determining the extent of movement of the driving means.

8. Apparatus of the character described comprising, mechanism for supporting a pan adapted to receive material from a tubing machine, said mechanism including a rotatable member, driving means for rotating the member, mechanism for reciprocating the driving means in a radial path with respect to the member, said reciprocating mechanism including a rotating shaft, means for reversing the direction of rotation of said shaft, a slide on said shaft moved by the rotation thereof, said reversing means being controlled by a device carried by the slide, a guide for the material located above the rotary member, a slide upon which said guide is mounted, and a reversible rotary shaft carrying the slide and determining the movement of the slide by the direction of its rotation, said last named shaft being actuated by said reversing means.

9. Apparatus of the character described comprising, mechanism for supporting a pan adapted to receive material from a tubing machine, said mechanism including a rotatable member, driving means for rotating the member, mechanism for reciprocating the driving means in a radial path with respect to the member, means for determing the extent of movement of the driving means in each direction, said determining means being controlled by a device carried by the reciprocating means, a guide for the material located above the rotary member, said guide being adapted to reciprocate radially of the member in coincidence with the driving means and being governed by the means for determining the extent of movement of the driving means, and means for intermittently depositing talc, or the like, upon the material in the pan, said talc depositing means being operated and controlled by the mechanism for reciprocating the driving means.

10. Apparatus of the character described comprising, mechanism for supporting a pan adapted to receive material from a tubing machine, said mechanism including a rotatable member, driving means for rotating the member, mechanism for reciprocating the driving means in a radial path with respect to the member, said reciprocating mechanism including a rotating shaft, means for reversing the direction of rotation of said shaft, a slide on said shaft moved by the rotation thereof, said reversing means being controlled by a device carried by the slide, a guide for the material located above the rotary member, a slide upon which said guide is mounted, a reversible rotary shaft carrying the slide and determining the movement of the slide by the direction of its rotation, said last named shaft being actuated by said reversing means, and means for intermittently depositing talc, or the like, upon the material in the pan, said talc depositing means being operated and controlled by said reversing means.

11. Apparatus of the character described comprising, mechanism for supporting a pan adapted to receive material from a tubing machine, said mechanism including a rotatable member, a housing axially coincident with the center of said member, two housings adjacent the periphery of said member, elements for carrying and rotating the member located in the central housing, a guide for the material carried by one of the other housings, elements in said last named housing for actuating the guide, means for depositing talc, or the like, upon the material in the pan, said talc depositing means being carried by the third housing, and elements within said third housing for actuating said talc depositing means.

12. Apparatus of the character described comprising, mechanism for supporting a pan adapted to receive material from a tubing machine, said mechanism including a rotatable member, a housing axially coincident with the center of said member, two housings adjacent the periphery of said member, elements for carrying and rotating the member located in the central housing, a guide for the material carried by one of the other housings, elements in said last named housing for actuating the guide, means for depositing talc, or the like, upon the material in the pan, said talc depositing means being carried by the third housing, elements within said third housing for actuating said talc depositing means, a power shaft leading into the central housing, and other shafts engaged with said power shaft and radiating from the central housing for driving the rotary member, the guide and talc depositing means.

13. Apparatus of the character described comprising, mechanism for supporting an annular pan adapted to receive material from a tubing machine, said mechanism including a rotatable member having an elevated central portion, a housing axially coincident with the central portion, a spindle within said housing for carrying said member, a gear surrounding said spindle, driving elements connected with said gear for rotating the member by contact exterior to said housing, a guide for the material located at one side of said elevated central portion and above the periphery of the member, means for depositing talc, or the like, upon the material in the pan located at another side of said elevated central portion and above the periphery of the member, and means located beneath said member for actuating and controlling it, the guide and the talc depositing means.

In testimony that I claim the foregoing as my invention, I have signed my name this 18th day of Aug., 1922.

VERNON ROYLE.